United States Patent

Anders et al.

[15] 3,639,023
[45] Feb. 1, 1972

[54] POWER FILE LEVELING DEVICE

[72] Inventors: Walter G. Anders; Jon S. Skolmutch, both of Canton, Ohio

[73] Assignee: Diebold Incorporated, Canton, Ohio

[22] Filed: Nov. 5, 1970

[21] Appl. No.: 87,228

[52] U.S. Cl. ............................312/268, 312/91, 312/223
[51] Int. Cl. ...................................................A47b 49/00
[58] Field of Search ...........................312/268, 223; 198/137

[56] References Cited

UNITED STATES PATENTS

| | | | |
|---|---|---|---|
| 3,363,958 | 1/1968 | Antram | 312/268 |
| 3,166,366 | 1/1965 | Krug et al. | 312/223 |
| 3,224,825 | 12/1965 | Sturgis et al. | 312/268 |
| 3,297,378 | 1/1967 | Krug et al. | 312/223 |
| 3,321,260 | 5/1967 | Anders | 312/268 |
| 3,532,405 | 10/1970 | Anders | 312/268 X |

*Primary Examiner*—James T. McCall
*Attorney*—Frease & Bishop

[57] ABSTRACT

A leveling control mechanism for a power filing appliance wherein a number of pan assemblies travel on an endless conveyor in a continuous path. The leveling control mechanism stops the conveyor so that any selected pan will have a location within one thirty-second of an inch of a desired location regardless of the direction of movement of the conveyor or of unbalanced loading of the conveyor pans or system.

17 Claims, 10 Drawing Figures

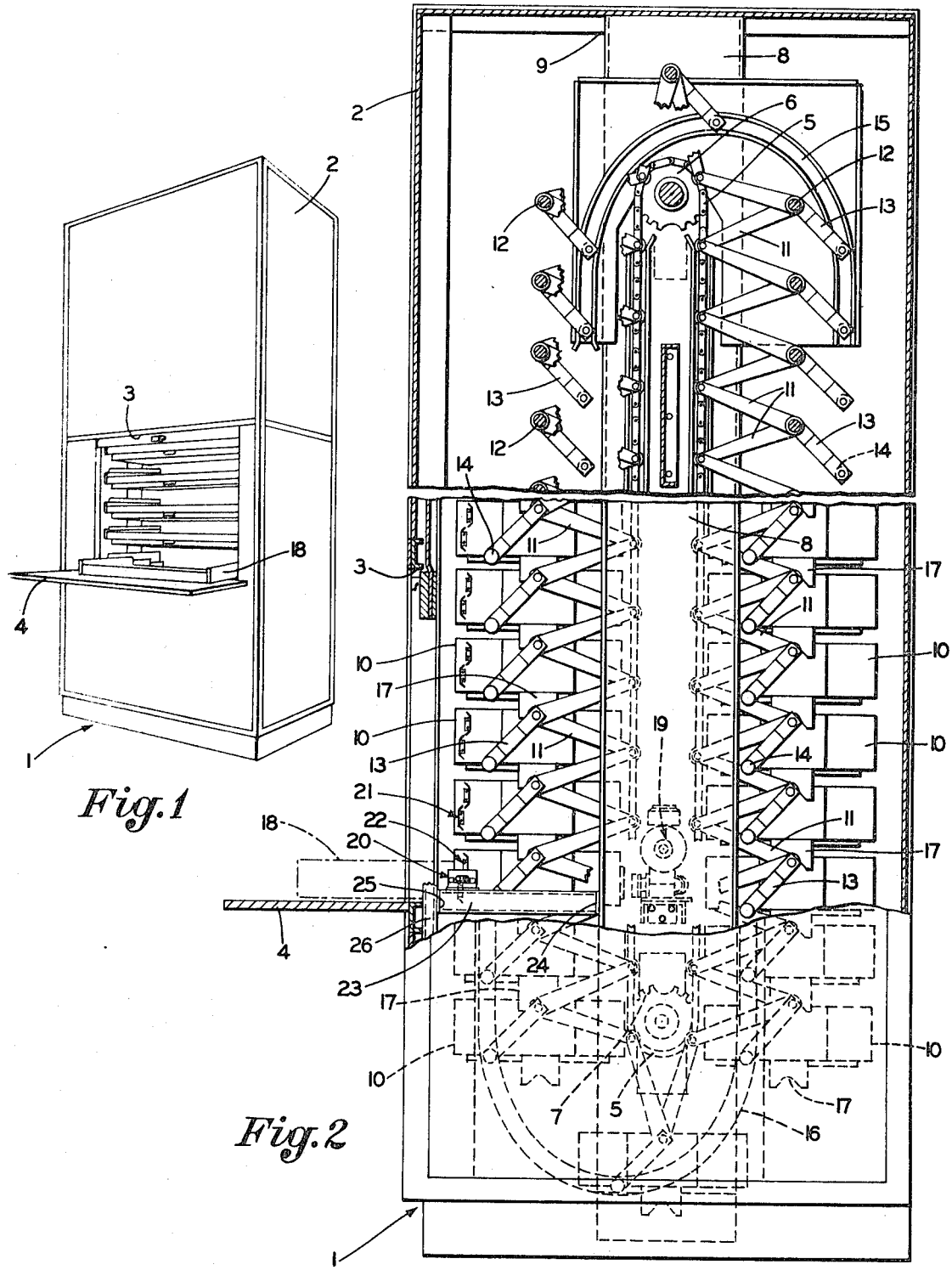

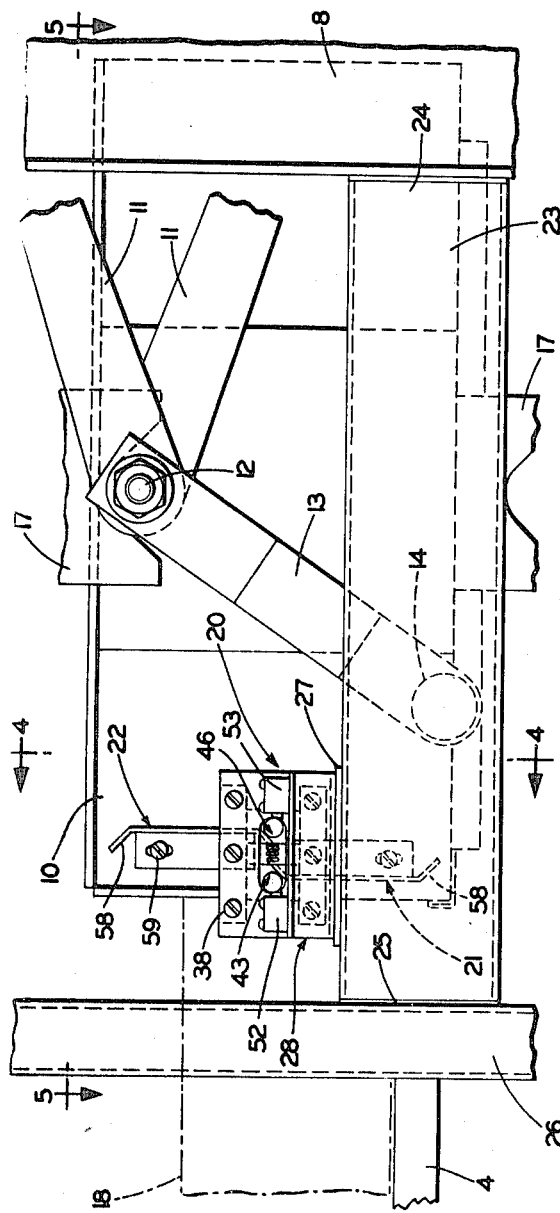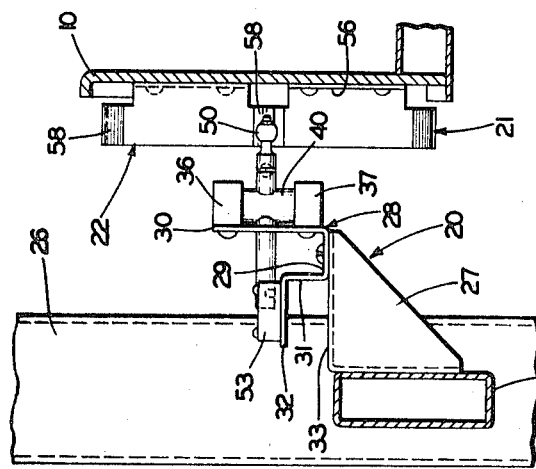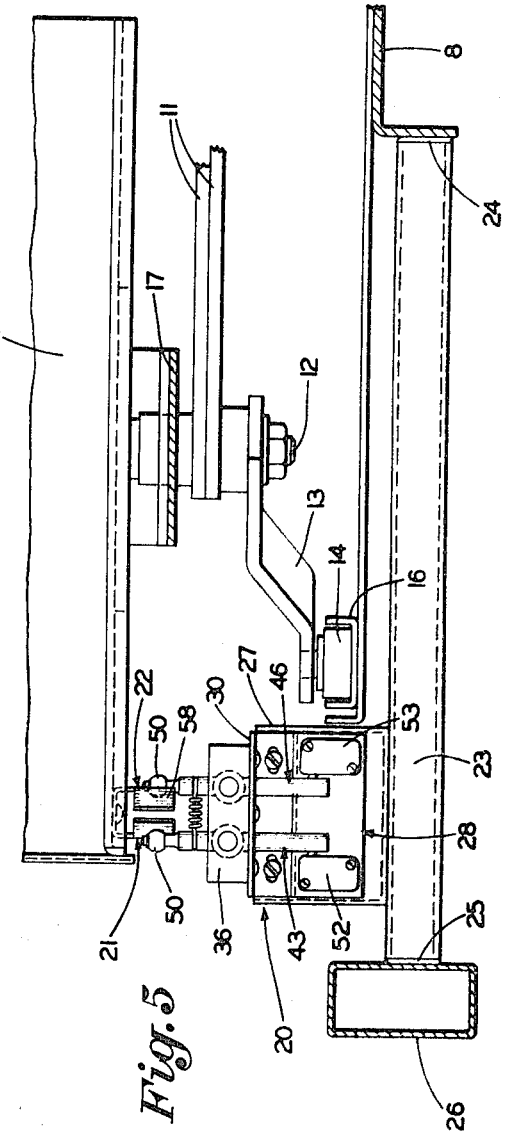

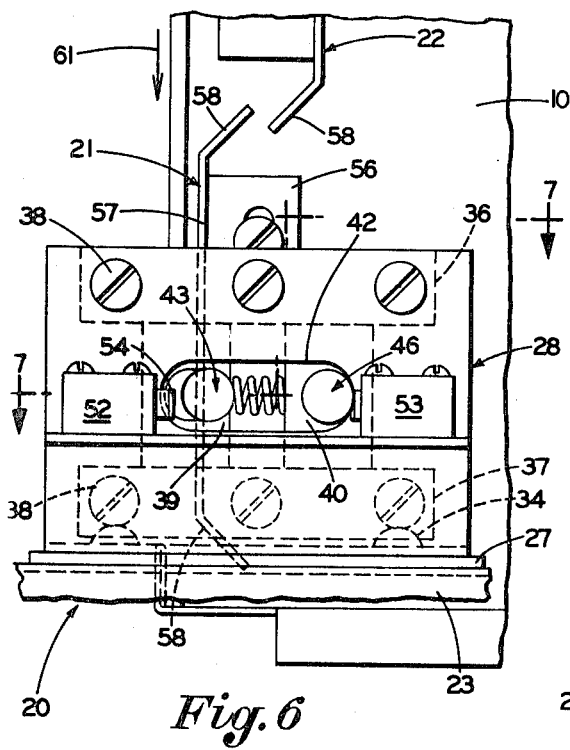
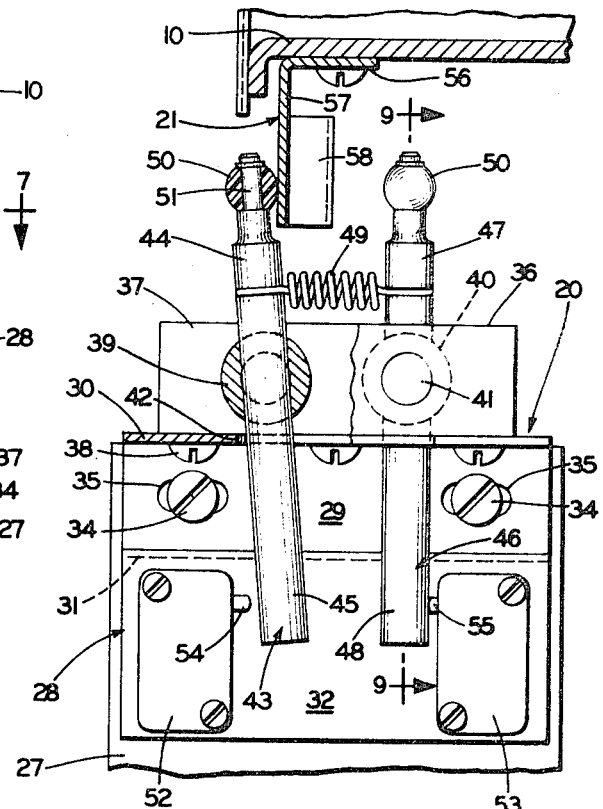
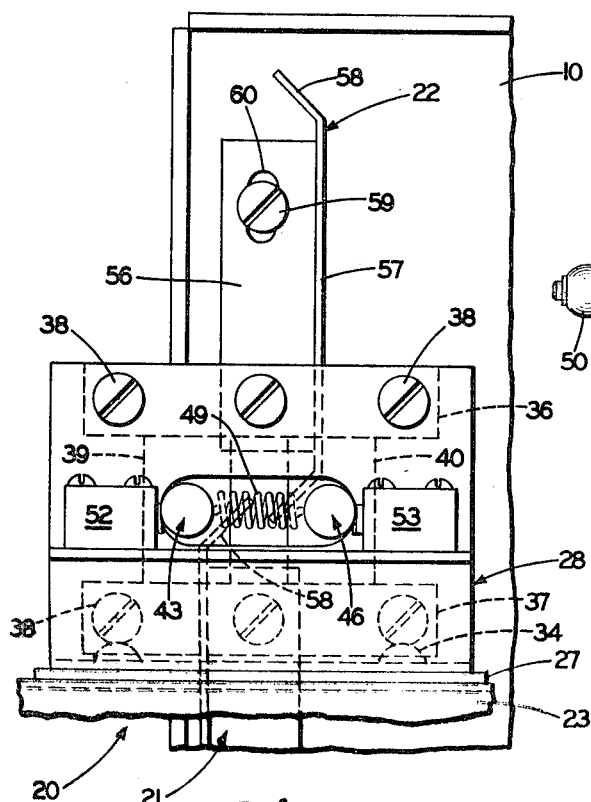

POWER FILE LEVELING DEVICE

CROSS-REFERENCE TO RELATED PATENT

The leveling control mechanism is an improvement upon the structure of U.S. Pat. No. 3,363,958.

BACKGROUND OF THE INVENTION

1. Field of the Invention

The invention relates to a power file of the type of which a plurality of pans are mounted on an endless conveyor for movement in either direction of conveyor travel and any selected pan is delivered by power means to a work station, where a drawer supported on the pan may be moved by power mechanism between retracted and extended positions at the work station, or where a mechanical handling device may be located which manipulates or extracts from the pan some object located at a predetermined position on the pan. Certain types of such power files in use require that any selected pan must be moved to and stopped at a predetermined work station location within at least one thirty-second of an inch of an exact location, so that other equipment the operation of which must be coordinated with conveyor operation may function properly in respect of objects or materials carried by any selected pan.

2. Description of the Prior Art

Power file level control mechanism has been used, such as shown in U.S. Pat. No. 3,363,958, in connection with the delivery of a selected pan to a location adjacent a work station or counter where a tray or drawer on the selected pan may be moved to an "out" or extended position. The endless power file conveyor, powered by a reversing motor whose movement and stopping is controlled by the level control mechanism, has a stabilizing roller associated with each pan. In the prior structure, a stabilizing roller associated with one pan spaced a considerable distance away from a selected pan, is used to actuate switch means to control the stopping of the selected pan at the predetermined location or work station.

Several considerations inherent in the construction and operation of the prior level control mechanism prevent stopping of the selected pan accurately within at least one thirty-second of an inch of an exact location at a work station. First of all, manufacturing tolerances and play between component parts of the conveyor system can make a difference of as much as an eighth of an inch in the distance between a first stabilizing roller and a first pan indexed by the first stabilizing roller, and the distance between a second roller and a second pan indexed by said second stabilizing roller.

Next, the direction of travel of the conveyor, the loading of the conveyor system, and the speed of travel under different loading conditions and direction of travel, can vary the space between such roller-pan indexed relationships.

Next, the length of the "null," which determines the time during which a circuit is broken, in the rotary selector switch controls for a power file, such as in rotary switches of the type shown in U.S. Pat. No. 3,198,894, can prevent the prior level control mechanism from stopping the selected pan within one thirty-second of an inch of an exact location at a work station.

Differences of as much as an eighth of an inch between the location of a selected pan at a work station and a predetermined position at such work station do not interfere with proper operation of a power file where a drawer on the pan is to be ejected from the pan at the work station as in U.S. Pat. Nos. 3,363,958, 3,532,405, and 3,537,768. However, variations in the exact delivered location of a selected power file pan in excess of one thirty-second of an inch cannot be tolerated where the movement or operation of other mechanisms must be coordinated exactly with the selected power file pan delivered at the work station.

These deficiencies in prior power file level control mechanisms have presented problems in a field where power file operation is coordinated with information retrieval devices or devices for photographing or televising objects stored in a power file and which must be extracted for such photographing or televising.

SUMMARY OF THE INVENTION

Objectives of the invention include providing a power file of the type described with a level control mechanism which will stop a selected file pan within one thirty-second of an inch of a predetermined location at a work station when approaching the predetermined location from either direction of conveyor movement with or without unbalance of the conveyor system; providing a construction in which each pan has adjustable actuating means directly engageable with control switch means controlling conveyor movement, so that the location at which any pan is stopped is directly related to the pan itself and is not indirectly determined through remotely located components of the conveyor mechanism or by rotary switch characteristics; and providing a level control mechanism for a power file eliminating difficulties heretofore encountered, achieving the indicated objectives simply, effectively and with precision, and solving problems, and satisfying needs existing in the art.

These objectives and advantages are obtained by the power file leveling mechanism, the general nature of which may be stated as including, in a power file of a type in which a plurality of pans are mounted on an endless conveyor mechanism carried by support means for movement in either direction in a continuous path of travel and any selected pan is delivered by conveyor drive power means which may move the conveyor in either direction to a predetermined work station location; leveling control mechanism including first components mounted at a fixed location on a file member adjacent said work station and other components mounted on each pan for cooperative engagement with said first components; said first components including up and down conveyor movement control levers having front and rear ends, the front ends projecting toward and adjacent the path of travel of the pans, said levers being pivotally mounted intermediate their ends and having their rear ends located to engage and actuate up and down conveyor drive control microswitches; said microswitches being normally closed and said levers being normally biased with their rear ends holding the microswitch contacts open; said pan mounted components including up and down vertically and laterally spaced and vertically offset adjustable ramp means on an end of each pan; said up and down ramp means being vertically adjustable on each pan and relative to each other; the front ends of said control levers preferably having ball rollers pivotally mounted thereon; the up and down lever ball rollers being engageable respectively with the up and down pan ramps during up and down movement of the pans; means mounting the control levers for lateral adjustment with respect to the path of movement of the pan ramps; and each pan ramp having a lever roller engageable cam flange preferably terminating at its upper and lower ends in an angular ear.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set forth in the appended claims.

FIG. 1 is a perspective view of a power file equipped with the improved level control mechanism;

FIG. 2 is an enlarged side elevation with parts broken away and in vertical section at various locations looking from the right side of FIG. 1, showing the pans in full lines in one sectional portion, and showing a drawer in dot-dash lines ejected from one pan at a work station at an exact location determined by the improved level control mechanism;

FIG. 3 is an enlarged fragmentary view of a portion of the file and of a selected pan stopped at a work station;

FIG. 4 is a fragmentary view looking in the direction of the arrows 4—4, FIG. 3;

FIG. 5 is a fragmentary plan view looking in the direction of the arrows 5—5, FIG. 3;

FIG. 6 is an enlarged fragmentary view similar to a portion of FIG. 3 showing a pan moving downward toward and approaching the predetermined location where it is to stop at a work station;

FIG. 7 is an enlarged view of a portion of FIG. 5 looking in the direction of the arrows 7—7, FIG. 6;

FIG. 8 is an enlarged view similar to FIG. 6 but showing the selected pan stopped at the exact predetermined location at the work station;

FIG. 9 is a sectional view taken on the line 9—9, of FIG. 7; and

Similar numerals refer to similar parts throughout the drawings.

DESCRIPTION OF THE PREFERRED EMBODIMENT

Figure 10:
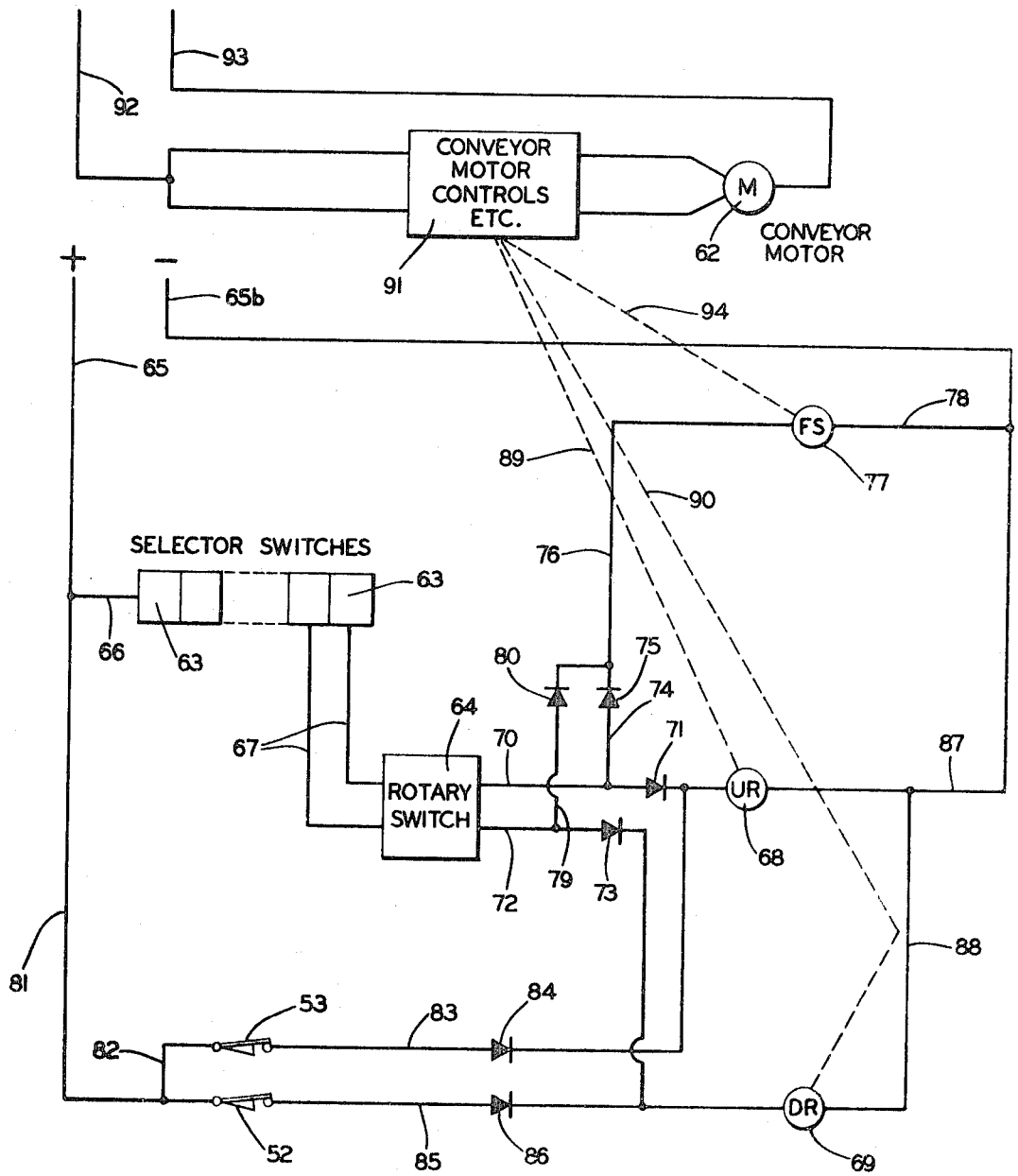
FIG. 10 is a wiring diagram for the construction.

The improved power file leveling mechanism is illustrated and described in the drawings in connection with power files of the types shown in U.S. Pat. Nos. 3,363,958, 3,532,405, and 3,537,768.

A power file is indicated generally at 1 and may include a housing or cabinet 2, the front wall of which may be provided with an opening 3 above a counter or a work station 4. A pair of conveyor chains 5 trained over sprockets 6 and 7 mounted on upright support members 8 carried at 9 within housing 2 mount a series of pans 10 for movement in either direction in a continuous path of travel.

Each pan 10 is supported or mounted at each end on a pair of arms 11 fixed to a chain 5, and the arms 11 pivotally support an end of pan 10 on pivot stub shafts 12. A stabilizing arm 13 is fixed to each end of each pan 10 having a roller 14 at its other end. Rollers 14 engage and are guided in movement around the upper and lower ends of the path of conveyor travel by semicircular guide channels 15 and 16 to maintain pans 10 in a horizontal position throughout the upper and lower ends of their path of travel on conveyor 5 when traveling around sprockets 6 and 7. Horizontal positioning of pans 10 is maintained during travel in the vertical flights between sprockets 6 and 7 by engagement of V-ears 17 at each end of one pan 10 with the pivot stub shafts 12 of the pan 10 next below.

Conveyor 5 is driven in a suitable manner from a drive motor 62 (FIG. 10) which may be a reversing motor, operated preferably by pan selector switches 63 and a rotary selector control switch 64 of a type such as described in U.S. Pat. No. 3,198,894, through up and down holding control and motor drive circuits, relays, etc., such as shown and described in U.S. Pat. No. 3,363,958. The detailed construction and operation of the conveyor, housing, etc., thus briefly described herein may be of the type shown in U.S. Pat. No. 3,199,658.

Power files shown in the identified patents comprise a plurality of pans mounted on an endless conveyor for movement in either direction in a continuous path of travel. Any selected pan is delivered through actuation of a selector switch for a particular pan by power operation of the conveyor to a location opposite the work station 4. When delivered opposite such work station a drawer or tray, such as shown in dot-dash lines at 18 in FIGS. 2 and 3, on suspension mechanism on its pan may be moved between retracted and extended positions, either manually or automatically by a power-driven ejector mechanism such as shown in said U.S. Pat. Nos. 3,363,958, 3,532,405 and 3,537,768, such ejector mechanism being generally indicated at 19 in FIG. 2.

The conveyor 5 moved by a drive motor 62 in accordance with selector switch operation, and selector, holding and drive circuits and relays, as described, also may be accomplished manually by operation of manual "up" and "down" buttons, as indicated in U.S. Pat. No. 3,363,958.

The leveling mechanism, in accordance with the invention, includes elements or components mounted at a fixed location adjacent the work station 4, and elements or components mounted on each pan 10. The components mounted at a fixed location are generally indicated at 20, and the components mounted on each pan comprise a "down" ramp generally indicated at 21 and an "up" ramp generally indicated at 22.

A stringer or rail 23 is mounted at one end 24 on the upright support member 8 (FIGS. 2, 3 and 5), and at its other end 25 on an upright post 26 located within cabinet 2 at the front right-hand corner of the cabinet. A bracket 27 is mounted on stringer 23 facing and projecting toward the conveyor mechanism (FIG. 4) generally aligned opposite the front faces of the pans 10 presented at the cabinet opening 3.

An angular bracket generally indicated at 28 is mounted on bracket 27 and is generally U-shaped and has a channel web 29, a long vertical flange 30, and a shorter vertical flange 31 terminating in an out-turned horizontal flange 32. Bracket 28 is adjustably mounted on the top wall 33 of bracket 27. The adjustable mounting may comprise bolts 34 engaged with top wall 33 of bracket 27 and bolts 34 extend through slots 35 in bracket web wall 29 of bracket 28. The slots 35 are elongated in a horizontal direction perpendicular to the vertical path of travel of the pans 10 past the cabinet opening 3.

The long bracket flange 30 facing the conveyor has an upper journal block 36 and a lower journal block 37 mounted on its outer surface by screws 38. The blocks 36 and 37 preferably are Nylon blocks for reducing frictional resistance to movement of movable parts mounted thereon. Spaced vertically extending pivot shafts 39 and 40 have reduced-diameter pintles 41 at either end journaled in said journal blocks 36 and 37 (FIGS. 7 and 9). Bracket flange 30 is formed with a horizontally extending slot 42 intermediate the blocks 36 and 37. A "down" control lever 43 is mounted on, and extends through, pivot shaft 39 perpendicular to the axis of the shaft with its front end 44 projecting generally toward the pans 10 and its rear end 45 extending above the horizontal bracket flange 32 (FIGS. 7 and 8). Similarly, an "up" control lever 46 is mounted on pivot shaft 40 with its front end 47 projecting toward pans 10 and its rear end 48 located above bracket flange 32. The rear ends of levers 43 and 46 extend through the elongated bracket slot 42.

A spring 49 (FIG. 7) is connected with the front ends 44 and 47 of levers 43 and 46 normally biasing the front ends of the levers toward each other in the normal position illustrated in FIG. 5. A spherically shaped ball-like roller 50, formed preferably of Nylon, is pivotally mounted at 51 at the extreme front end of each lever 43 and 46.

A "down" control microswitch 52 and an "up" control microswitch 53 are mounted in spaced relation on the horizontal bracket flange 32 at locations so that the rear end 45 of lever 43 can engage the actuating button 54 of switch 52 and so that the rear end 48 of lever 46 can engage the actuating button 55 of switch 53. In the normal position of levers 43 and 46 (FIG. 5) the actuating buttons 54 and 55 of switches 52 and 53 are engaged.

The "down" and "up" ramps 21 and 22 mounted on the end wall of each pan 10 face toward the fixed location leveling mechanism components 20. Each ramp preferably comprises an angle bracket having a mounting flange 56 and a cam flange 57 with the upper and lower ends of the cam flange 57 each terminating in an angular ear 58. Each ramp 21 and 22 is vertically adjustable on its pan end wall. The adjustable mounting preferably includes mounting bolts 59 bolted to the pans 10 and extending through vertically elongated slots 60 formed in the mounting flange 56 of each ramp 21 and 22.

Microswitches 52 and 53 have normally closed contacts and the switches are held open by the levers 43 and 46 when the latter are in normal position, as shown in FIG. 5. The contacts of microswitches 52 and 53 are in circuits which control energizing reduced voltage motor drive circuits for driving the conveyor motor in either direction. These circuits are illustrated diagrammatically in FIG. 10.

Direct current power supply lines 65a and 65b supply power for the control circuitry. Line 66 is connected to pan selector switches 63, which in turn are electrically connected by lines such as 67 with rotary selector control switch 64 which controls "up" and "down" movement of the conveyor through up-relay 68 and down-relay 69. Rotary switch is connected by wire 70 through diode 71 to up-relay 68, and by wire 72 through diode 73 to down-relay 69. Wire 74, diode 75 and line 76 connect wire 70 with fast speed relay 77, which is connected by wire 78 with negative powerline wire 65b. Wire 79, diode 80 and line 76 connect wire 72 with relay 77.

The normally closed up and down control microswitches 53 and 52 are connected by lines 81 and 82 with the positive power supply line wire 65a. Wire 83 and diode 84 connect up-microswitch 53 with wire 70 beyond diode 71 to up-relay 68; and wire 85 and diode 86 connect down-microswitch 52 with wire 72 beyond diode 73 to down-relay 69. Wires 87 and 88 connect relays 68 and 69 with the negative power supply line wire 65b. Diodes 71, 73, 75, 80, 84 and 86 pass current in one direction only in the direction of the arrowheads of the symbols shown.

As indicated by long dashed lines 89 and 90 running from up and down relays 68 and 69, respectively, the conveyor motor controls 91, control operation of conveyor motor 62 for selective up and down movement, the motor 62 being supplied with power by line wires 92 and 93. Similarly, as indicated by long dashed line 94, the speed of operation of motor 62 is controlled by fast speed relay 77. In other words, lines 89 and 90 tell the motor controls 91 the direction that reversing motor 62 should be operated, and line 94 tells the motor controls 91 the speed at which motor 62 should run.

Fast speed relay 77 is only energized when the conveyor is running under control of rotary switch 64. When energized, relay 77 directs controls 91 to supply power to motor 62 at high voltage, say 95 volts, for fast speed conveyor operation. When relay 77 is deenergized by rotary switch 64, as when the rotary switch is on a gap or "null" between contacts indexed for a selective pan, the relay 77 contacts direct controls 91 to supply low voltage power, say 48 volts, for slow operation of the conveyor. The direction of slow speed operation again is controlled by relays 68 and 69 which are connected with microswitches 53 and 52 and when either is closed, the motor 62 runs in the required direction at slow speed.

OPERATION OF THE LEVELING MECHANISM

Assume that a selector switch 63 has been pressed to cause the file to deliver a particular pan 10 at the work station. The rotary switch 64 through either the up-relay 68 or down-relay 69 directs the controls 91 to operate motor 62 in the required direction and at fast speed, say with power supplied at 95 volts DC.

Next, let it be assumed that the particular pan 10 illustrated in FIGS. 3, 4, 5, 6, and 7, is to be stopped at the work station 4, and is traveling downward as represented by the arrow 61 in FIG. 6, but is above the position shown in FIG. 6 so that ramp 21 has not yet contacted the roller 50 at the front end 44 of lever 43.

As pan 10 moves downward under fast speed conveyor drive movement in the direction of arrow 61, the ear 58 at the lower end of cam flange 57 of ramp 21 engages the ball roller 50 of down control lever 43, moving the lever 43 to the position shown in FIG. 7. Such lever movement releases actuating button 54 of down control microswitch 52, permitting the switch 52 which had been held open to close. Closing of switch 52 completes the circuit through lines 65a, 81, switch 52, diode 86, wire 85 and down-relay 69, to direct controls 91 to continue to operate motor 62 for conveyor movement down.

Meanwhile as selected pan 10 moves to within 2 to 3 inches of the predetermined stopped location, the "null" in the rotary switch for the selected pan 10 breaks the circuit from rotary switch 64 to fast speed relay 77. When relay 77 is deenergized it signals controls 91 to switch from high to low voltage power supply to motor 62. Thus, the conveyor continues to move at slow speed in the down directions, and the particular selected pan 10 shown in FIG. 6 continues to move downward in the direction of the arrow 61. As selected pan 10 approaches and reaches the position shown in FIG. 8, the upper ear 58 on ramp 21 releases engagement with roller 50 on down control lever 43; and, through the action of spring 49, the lever 43 moves to the position shown in FIG. 5 where the rear end 45 of lever 43 again engages and actuates button 54 of microswitch 52 to open its normally closed condition. When microswitch 52 is opened, the reduced voltage circuit is opened and the conveyor drive motor stops, thus stopping the conveyor.

It if should happen, due to unbalanced loading, that the pans mounted on and moving down on the left side of the conveyor in FIG. 2 have excess weight or excess loading, as compared to the loading of the pans 10 moving upward on the right side of the conveyor of FIG. 2; the selected pan 10 in FIG. 8 when being stopped may tend to coast downward beyond the position shown in FIG. 8 relative to the control levers 43 and 46. If this happens the up control lever 46 is actuated by up-ramp 22 to close up-switch 53 and energize the up-relay 68 to provide reduced voltage and thus reduced speed operation of motor 62 to move pan 10 upward from its downwardly coasted position back to the position shown in FIG. 8. This, of course, involves reversing the direction of motor drive when the conveyor is driven up, rather than down, with respect to the pan positions illustrated in FIGS. 6 and 8.

When it happens that the selected pan to be delivered to and stopped at work station 4 approaches the work station moving up rather than down, as just described, the operation of the ramps, control levers, etc., is the reverse of that described concerning down conveyor movement arrival of a pan at the work station.

A fundamental aspect of the invention is the location of the stopping control mechanism so that the mechanism is actuated by the pan itself that is to be stopped, and not by some remotely related movable element of the conveyor mechanism.

Another important aspect of the invention is the slowing down of drive motor operation of the conveyor as any selected pan approaches the location where it is to be stopped.

These fundamental concepts function and cooperate to overcome difficulties previously encountered in power file operation incident to unbalanced pan and conveyor loading, direction of conveyor travel, alack in conveyor drive mechanism, variations in spacing due to manufacturing and assembly tolerances, wear of parts, etc.

A further difficulty that is overcome, is that inherently presented by the required spacing, however small, of the "null" between positions of the rotary switch for each selected pan indexed with relation to the pan selector switches and the pans represented thereby.

The improved power file leveling mechanism enables any selected pan to be stopped within one thirty-second of an inch of a predetermined required location, with the selected pan approaching from either direction, whether or not the conveyor loading is balanced or unbalanced.

As indicated, the ramps 21 and 22 on the end of each pan may be adjusted vertically with respect to each other and with respect to the pan so that the exact relationship between the ramps and the control levers 43 and 46 may be established when the file is assembled and put into operation.

Coordinated with this adjustment is the adjustment that may be made of the mounting of bracket 28 on bracket 27 so that the normal position (FIG. 5) of the control levers 43 and 46 with respect to the ramps 21 and 22 may be established on assembly of the power file.

The spherical follower rollers 50 on the ends of control levers 43 enable the relative coordinated positions of the levers and ramps to be maintained regardless of the angular position of either of the levers 43 and 46.

The positively driven, but slowed down, operation of the conveyor as any pan approaches the position at which it is to be stopped, also permits very rapid operation or fast travel of the conveyor at other times when the conveyor is moving.

The improved leveling control mechanism thus provides positive control by the selected pan itself of the position at which the pan will be stopped at a predetermined location at a work station; provides a construction in which the leveling control mechanism actuated by the selected pan itself operates to slow down the positive power drive of the conveyor as the selected pan approaches its predetermined stopped position; provides for the adjustment of the leveling control mechanism components for each pan so that the exact relationship required can be established and maintained; provides a construction which eliminates variable manufacturing, assembly and operating characteristics of the drive and control mechanisms from file to file; and provides a construction that avoids the difficulties and eliminates the problems heretofore encountered in the art with prior leveling control devices, thereby achieving the objectives indicated and solving problems which have arisen in the art.

In the foregoing description, certain terms have been used for brevity, clearness and understanding, but no unnecessary limitations are to be implied therefrom because such terms are used for descriptive purposes and are intended to be broadly construed.

Moreover, the description and illustration of the invention is by way of example, and the invention is not limited to the exact structures shown because the parts, components and mechanisms may be varied to provide other structural embodiments without departing from the fundamental concepts, aspects and principles of the invention.

Having now described the features, discoveries and principles of the invention, the construction, assembly, characteristics, operation and use of a preferred form thereof, and the advantageous, new and useful results obtained thereby, the new and useful discoveries, principles, apparatus, combinations, parts, elements, subcombinations, structures and cooperative relationships which characterize the invention are set forth in the appended claims.

We claim:

1. In a power file of a type in which a plurality of pans are mounted on an endless conveyor mechanism carried by support means for movement in either direction in a continuous path of travel and any selected pan is delivered by movement in either direction to a predetermined work station location, by actuating a pan selector switch in circuitry with rotary selector control switch means and conveyor power drive means; pan leveling control mechanism for stopping any selected pan at said predetermined station including, spaced "up" and "down" control lever means pivotally mounted on said support means; normally closed microswitch means including control circuitry controlling voltage supplied to said power drive means connected with said power drive means circuitry, associated with and actuated by each "up" and "down" control lever means; said microswitch means including switches mounted on said support means; the "up" and "down" control lever means being spring-biased normally to engage the respective associated microswitch means to hold said microswitch means open; and actuator means mounted on and projecting from each pan and moving past and engaging said control lever means during movement of the conveyor; the actuator means on a selected pan engaging said control lever means as said selected pan approaches said control lever means to move the control lever means out of normal position to a position disengaging its associated microswitch means permitting the latter to close and actuate the control circuitry to supply reduced voltage to said power drive means and slow conveyor movement, and to then disengage the control lever means to permit the lever means to return to normal position reengaging its associated microswitch means to open said microswitch means and stop conveyor movement with said selected pan at said predetermined work station location.

2. The construction defined in claim 1 in which each "up" and "down" control lever means includes a lever having a front and a rear end pivotally mounted intermediate its ends on said support means.

3. The construction defined in claim 1 in which the support means is provided with a first bracket, in which a second bracket is adjustably mounted on the first bracket, in which the "up" and "down" control lever means is pivotally mounted on the second bracket, and in which the microswitch means switches are mounted on said second bracket.

4. The construction defined in claim 1 in which the support means is provided with bracket means, in which the "up" and "down" control lever means includes levers each having a front and a rear end pivotally mounted intermediate its ends on said bracket means, in which the front ends project toward the ends of the pans adjacent the path of travel of the pan ends, and in which the rear lever ends are located adjacent to and engage their respective associated microswitch means switches.

5. The construction defined in claim 1 in which the support means is provided with a first bracket, in which a second bracket is adjustably mounted on the first bracket, in which the "up" and "down" control lever means includes levers each having a front and a rear end pivotally mounted intermediate its ends on the second bracket, in which the front ends project toward the ends of the pans adjacent the path of travel of the pan ends, in which the microswitch means switches are mounted on said second bracket, and in which the rear lever ends are located adjacent to and engage their respective associated microswitch means switches.

6. The construction defined in claim 1 in which the "up" and "down" control lever means each include a lever having a front and a rear end pivotally mounted intermediate its ends on the support means, and in which spring means is attached to front end portions of adjacent levers normally urging the front ends of said levers toward each other about their pivot mountings.

7. The construction defined in claim 1 in which the support means is provided with bracket means, in which the "up" and "down" control lever means includes levers each having a front and a rear end pivotally mounted intermediate its ends on the bracket means, in which the front ends project toward the ends of the pans adjacent the path of travel of the pan ends, in which spring means is attached to the front end portions of the levers normally urging the front ends of said levers toward each other about their pivot mountings, and in which the rear lever ends are located adjacent to and engage their respective associated microswitch means switches.

8. The construction defined in claim 1 in which the "up" and "down" control lever means includes a lever having a front and a rear end pivotally mounted intermediate its ends on the support means, and in which a spherically shaped roller is journaled on the front end of each lever.

9. The construction defined in claim 1 in which each "up" and "down" control lever means includes a lever having a front and rear end, in which the support means is provided with bracket means including a U-shaped bracket member having a vertical flange and a horizontal flange, in which each lever is pivotally mounted on a vertical axis on said vertical flange with its rear end projecting adjacent and above said horizontal flange, and in which said microswitch means includes an "up" microswitch and a "down" microswitch mounted on said horizontal flange at locations adjacent the rear ends of the respectively associated "up" and "down" control lever means levers, whereby movement of either of said levers out of normal position actuates its associated microswitch means switch.

10. The construction defined in claim 1 in which the support means is provided with a first bracket, in which a second bracket is adjustably mounted on the first bracket, in which the "up" and "down" control lever means each includes a lever having a front end and a rear end, in which the second bracket comprises a U-shaped bracket member having a vertical flange and a horizontal flange, in which each lever is pivotally mounted intermediate its ends on a vertical axis on said vertical flange with its rear end projecting adjacent and above said horizontal flange, in which the microswitch means switches comprise an up-switch and a down-switch mounted on said horizontal flange adjacent the rear ends of the respectively associated "up" and "down" control levers, and in which a spherically shaped roller is journaled on the front end of each lever in the path of movement of said actuator means, whereby engagement of either roller by said actuator means moves the respective lever out of normal position and actuates its associated switch.

11. The construction defined in claim 1 in which each pan has an end wall movable past the spaced "up" and "down" control lever means, in which the actuator means mounted on each pan is mounted on said pan end, and in which the actuator means comprise "up" and "down" vertically and laterally spaced and vertically offset adjustable ramp means engageable with said control lever means.

12. The construction defined in claim 11 in which the "up" and "down" spaced ramp means each are vertically adjustable on each pan.

13. The construction defined in claim 11 in which each spaced "up" and "down" ramp means includes an angle member having an attaching flange and a cam actuator flange, and in which the cam actuator flange extends vertically and projects at right angles to the pan end toward the control lever means.

14. The construction defined in claim 13 in which each vertical cam actuator flange terminates at its upper and lower ends in an angular ear, and in which each cam flange moves in a path during conveyor movement for engagement with one of the "up" and "down" control lever means levers.

15. The construction defined in claim 1 in which the support means is provided with a first bracket, in which a second bracket is adjustably mounted on the first bracket, in which the "up" and "down" control lever means is pivotally mounted on the second bracket, in which the microswitch means switches are mounted on said second bracket, in which each pan has an end wall movable past the spaced "up" and "down" control lever means, in which the actuator means mounted on each pan is mounted on said pan end, in which the actuator means comprise "up" and "down" vertically and laterally spaced vertically offset adjustable ramp means engageable with said control lever means and in which the "up" and "down" spaced ramp means each are vertically adjustable on each pan.

16. The construction defined in claim 13 in which the "up" and "down" control lever means each includes a lever having a front and a rear end pivotally mounted intermediate its end on the support means, in which a spherically shaped roller is journaled on the front end of each lever, and in which the lever rollers engage the ramp means cam actuator flanges on each pan as the pans move past said control lever means.

17. In a power file of a type in which a plurality of pans are mounted on an endless conveyor mechanism carried by support means for movement in either direction in a continuous path of travel and any selected pan is delivered by movement in either direction to a predetermined work station location, by actuating a pan selector switch in circuitry with rotary selector control switch means and conveyor power drive means; control means including high and low voltages motor power supply circuitry connected with the rotary selector control switch means and with the conveyor power drive means operable to drive the drive means selectively at fast and slow speeds, and control lever actuated switch means mounted on the support means connected in circuitry with the power drive means; and means mounted on each pan engageable with said switch means control levers operable upon approach of a selected pan to said work station at fast speed to actuate the control means to change the power drive to slow speed operation, and to then stop said selected pan at said work station upon arrival of said selected pan at said station.

* * * * *